Patented Mar. 18, 1941

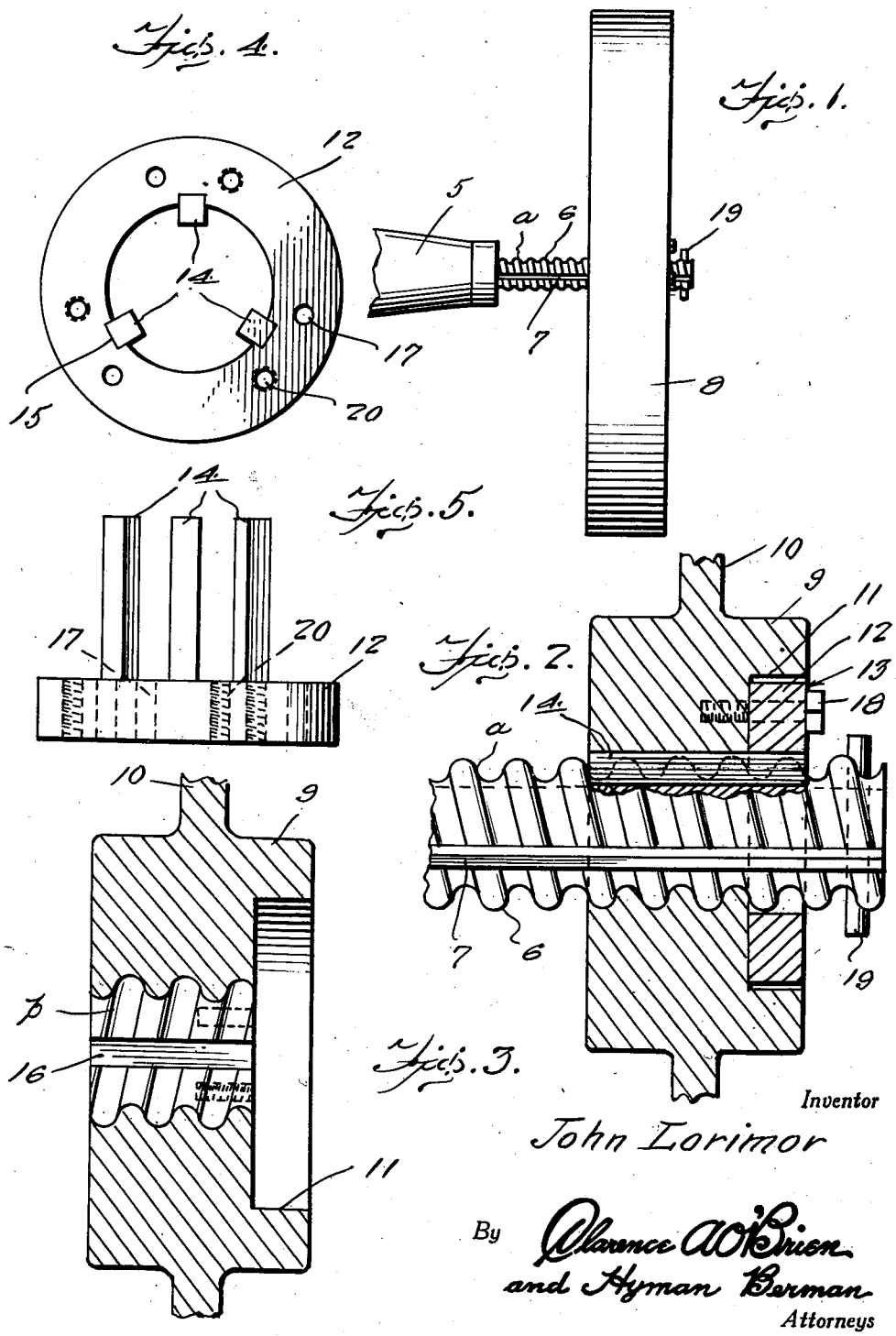

2,235,457

UNITED STATES PATENT OFFICE 2,235,457

DRIVING AXLE AND WHEEL HUB ASSEMBLY

John Lorimor, Imogene, Iowa

Application May 9, 1940, Serial No. 334,240

4 Claims. (Cl. 301—1)

This invention relates to new and useful improvements in wheels and axles and more particularly to an improved drive axle and wheel hub assembly especially adapted for use on tractors and like vehicles where wheels of different tread width are employed.

The principal object of the present invention is to provide an adjustable drive axle and wheel hub assembly whereby the hub can be adjusted to change the position thereof to precisely the extent desired on the axle, without removing wheel from axle, or raising wheel from the ground.

Other objects and advantages of the invention will become apparent to the reader of the following description.

In the drawing—

Figure 1 represents a fragmentary front elevational view showing the wheel and axle assembly.

Figure 2 is an enlarged fragmentary detailed sectional view through the axle and hub.

Figure 3 is a fragmentary sectional view through the hub without the axle and key unit.

Figure 4 is an end elevational view of the key unit.

Figure 5 is a side elevational view of the key unit.

Referring to the drawing wherein like numerals designate like parts, it can be seen that numeral 5 represents the drive axle housing such as will be found on conventional tractors and from this projects the drive axle 6 longitudinally formed with threads a and provided with key receiving grooveways 7, there being three shown in the drawing equally spaced circumferentially.

As shown in Figure 1 numeral 8 represents the wheel and in Figure 2 numeral 9 denotes the hub from which the spokes 10 extend to the wheel periphery or tread portion.

The outer side of the hub 9 is pocketed out to define the recess 11 into which fits the annulus 12 of the key unit generally referred to by numeral 13. This key unit has a plurality of keys 14 disposed in recesses 15 in the inner edge portion of the annulus 12 and these project laterally as shown in Figure 2, projecting into the aforementioned grooveways 7 of the drive axle 6 and also into grooves 16 extending through the hub 9 and intersecting the threads b in a bore of the hub 9 which extends from the recess 11 to the other side of the hub.

The annulus 12 has a plurality of smooth openings 17 therethrough, through which the machine screws 18 can be disposed and driven into the hub 9 for holding the key unit 13 properly on the hub 9, that is, after the hub 9 and wheel have been properly adjusted on the drive axle 6.

A stop pin 19 is disposed through the outer end of the drive axle 7.

The unit annulus 12 also has the threaded bores 20 therein, into which can be driven threaded instruments for permitting the unit 13 to be pulled from the hub after the machine screws 18 have been removed.

The grooves in the axle 6 are of uniform depth throughout their lengths, while the grooves in the hub 9 are slightly tapered, as are the keys 14, so that there will be a definite wedging of these keys 14 between the hub 9 and the axle 6 when the annulus 12 is secured in the recess 11 by the screws 18.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In combination, a drive axle, a wheel including a hub, said axle being threaded, said hub being internally threaded and feedable on the threaded axle, said axle being formed with a longitudinal slot and a removable key on the hub engageable into the said slot, said hub being formed with a groove extending therethrough and adapted to partly receive the key, said key including an elongated member and an annulus and securing means disposable through the annulus and into the hub and adapted to permit removal of the annulus and key from the hub and axle.

2. In combination, a drive axle, a wheel including a hub, said axle being threaded, said hub being internally threaded and feedable on the threaded axle, said axle being formed with a longitudinal slot and a removable key on the hub engageable into the said slot, said hub being formed with a groove extending therethrough and adapted to partly receive the key, said key including an elongated member and an annulus and securing means disposable through the annulus and into the hub and adapted to permit removal of the annulus and key from the hub and axle, said annulus being formed with a threaded recess into which a threaded instrument can be disposed for permitting removal of the annulus and key from the hub and axle after the securing means has been removed.

3. In combination, a drive axle, a wheel including a hub, said axle being threaded, said hub being internally threaded and feedable on the threaded axle, said axle being formed with a longitudinal slot and a removable key on the hub engageable into the said slot, said hub being formed with a groove extending therethrough and adapted to partly receive the key, said key including an elongated member and an annulus and securing means disposable through the annulus and into the hub and adapted to permit removal of the annulus and key from the hub and axle, said annulus being formed with a threaded recess into which a threaded instrument can be disposed for permitting removal of the annulus and key from the hub and axle after the securing means has been removed, said wheel being adjustable to any point on the drive axle without the removal of said wheel from axle and without the lifting of said wheel from ground or floor.

4. In combination, a drive shaft, said drive shaft being threaded, a wheel including a hub, said hub being internally threaded and being feedably disposed on the axle, said axle being formed with a longitudinally extending groove, said hub having a longitudinally extending groove, an annulus having a key extending laterally therefrom, said annulus being adapted to be secured to the hub with its key extending into both the grooves of the axle and hub.

JOHN LORIMOR.